(12) United States Patent
Shimamura et al.

(10) Patent No.: US 6,470,659 B2
(45) Date of Patent: Oct. 29, 2002

(54) FOUR WHEEL DRIVE WORKING VEHICLE

(75) Inventors: Teruo Shimamura, Nishinomiya; Osami Fujiwara, Kishiwada, both of (JP)

(73) Assignee: Kubota Corporation (JP)

( * ) Notice: Subject to any disclaimer, the term of this patent is extended or adjusted under 35 U.S.C. 154(b) by 0 days.

(21) Appl. No.: 09/273,393

(22) Filed: Mar. 22, 1999

(65) Prior Publication Data

US 2001/0013218 A1 Aug. 16, 2001

(30) Foreign Application Priority Data

Sep. 26, 1998  (JP) .......................................... 10-078986

(51) Int. Cl.⁷ .......................... F16H 35/00; F16H 43/20
(52) U.S. Cl. ........................ 56/14.7; 180/244; 180/338; 192/54.5; 192/69.4
(58) Field of Search ................................ 56/14.8, 14.7, 56/16.7, DIG. 6; 180/244, 247, 76, 338; 74/650; 192/36, 57.5, 69.4

(56) References Cited

U.S. PATENT DOCUMENTS

| | | | | |
|---|---|---|---|---|
| 4,352,418 A | * | 10/1982 | Teraoka ........................ 192/36 |
| 4,368,808 A | * | 1/1983 | Teraoka ........................ 192/36 |
| 4,609,064 A | * | 9/1986 | Suzuki et al. ................ 180/247 |
| 4,681,180 A | * | 7/1987 | Oyama et al. ................ 180/76 |
| 4,733,743 A | * | 3/1988 | Weiss et al. ................. 180/255 |
| 4,792,010 A | * | 12/1988 | Kitao et al. ................. 180/247 |
| 4,860,869 A | * | 8/1989 | Hall, III ...................... 74/650 |
| 4,895,051 A | * | 1/1990 | Weiss et al. .................. 74/711 |
| 4,895,217 A | * | 1/1990 | Hueckler et al. ........... 180/247 |
| 5,168,953 A | * | 12/1992 | Naito ........................... 180/76 |
| 5,269,732 A | * | 12/1993 | Weiss et al. ................. 475/249 |
| 5,335,746 A | * | 8/1994 | Betz ............................ 180/248 |
| 5,341,893 A | * | 8/1994 | Fukui et al. ................. 180/245 |
| 5,511,631 A | * | 4/1996 | Tsuchihashi et al. ........ 180/247 |
| 5,845,546 A | * | 12/1998 | Knowles et al. .............. 74/650 |
| 5,915,496 A | * | 6/1999 | Bednar et al. .............. 180/305 |
| 5,927,425 A | * | 7/1999 | Kusano ...................... 180/248 |

FOREIGN PATENT DOCUMENTS

| | | |
|---|---|---|
| GB | 984020 | 2/1965 |
| GB | 2252801 | 8/1992 |

* cited by examiner

*Primary Examiner*—Thomas B. Will
*Assistant Examiner*—Nathan Mammen
(74) *Attorney, Agent, or Firm*—Webb Ziesenheim Logsdon Orkin & Hanson, P.C.

(57) ABSTRACT

A four wheel drive working vehicle such as a front mower has a dual one-way clutch mechanism interlocked to right and left dirigible wheels. When the vehicle makes a turn in forward or backward running, the clutch mechanism breaks drive transmission only to an outer one of the dirigible wheels.

20 Claims, 6 Drawing Sheets

(A)

(B)

(A)

(B)

(A)

(B)

FOUR WHEEL DRIVE WORKING VEHICLE

BACKGROUND OF THE INVENTION

1. Field of the Invention

This invention relates to four wheel drive working vehicles such as lawn mowers, typically a front mower.

2. Description of the Related Art

With a four wheel drive working vehicle having rear wheels acting as dirigible wheels and being the part-time type without a center differential, for example, the rear wheel differential has a larger turning radius than the front wheel differential in time of making a turn in four wheel drive mode. In such a situation, the differential motion between the front wheels and the rear wheels cannot be absorbed, resulting in a tight corner braking phenomenon to hamper the small turn. However, it is very troublesome to break drive transmission to the front wheel differential or rear wheel differential each time a turn is made.

Conventionally, as shown in FIG. 6, a transmission line from a transmission case 7 to a front wheel differential 8 and a rear wheel differential 8a includes a dual one-way clutch 14 disposed in a position of the center differential.

In time of forward running, the rear wheel differential 8a has a turning radius Rr which is larger than a turning radius Rf of front wheel differential 8. Consequently, an output shaft 100 extending to the rear wheel differential 8a has a higher forward rotating rate than an input shaft 101 interlocked to the front wheel differential 8. At this time, the dual one-way clutch 14 breaks the transmission of forward drive from the input shaft 101 to the output shaft 100. In time of backward running also, the turning radius Rr of rear wheel differential 8a is larger than the turning radius Rf of front wheel differential 8. Consequently, the dual one-way clutch 14 breaks the transmission of backward drive from the input shaft 101 to the output shaft 100 when the backward rotating rate of output shaft 100 is higher than the backward rotating rate of input shaft 101.

In time of straight running, drive is transmitted from engine 4A to front wheels 1 and rear wheels 2 to produce a four wheel drive mode. When making a turn, the drive transmission to the rear wheels 2 acting as dirigible wheels S is broken to produce a two wheel drive mode.

With the above conventional construction, automatic switching is made to the two wheel drive mode when making a turn, and to the four wheel drive mode when running straight after making the turn. This provides excellent operability for making small turns. However, there is a drawback in that the driving force tends to be insufficient when making a turn in the two wheel drive mode.

SUMMARY OF THE INVENTION

The object of this invention is to provide a construction for making a small turn with a sufficient driving force.

The above object is fulfilled, according to this invention, by a four wheel drive working vehicle comprising a vehicle body, a pair of dirigible wheels supported by the vehicle body, a further pair of wheels supported by the vehicle body, an engine supported by the vehicle body, and transmission means for transmitting drive from the engine to the pair of dirigible wheels. The transmission means has a clutch mechanism operable, when the vehicle makes a turn, to break drive transmission to one of the dirigible wheels lying outwardly with respect to a turn center, and to maintain the drive transmission to the other dirigible wheel lying inwardly with respect to the turn center.

An inconvenience encountered when the vehicle makes a turn in a four wheel drive mode is that the outer dirigible wheel having the largest turning radius among the four wheels rotates too slowly. This outer dirigible wheel brakes the vehicle making the turn.

With this in view, the clutch mechanism is provided to break the drive transmission only to the outer dirigible wheel when the vehicle makes a turn. Thus, in time of turning, the outer dirigible wheel is placed in a state of free rotation. The vehicle can make a turn in a three wheel drive mode without being braked by the outer dirigible wheel.

Consequently, a small turn can be made in a strong and reliable way with a sufficient driving force based on three wheel drive.

Other features and advantages of this invention will be apparent from the following description of the preferred embodiment to be taken with reference to the drawings.

DETAILED DESCRIPTION OF THE PREFERRED EMBODIMENT

A front mower which is one example of four wheel drive working vehicles will be described hereinafter with reference to the drawings.

Figure 1:
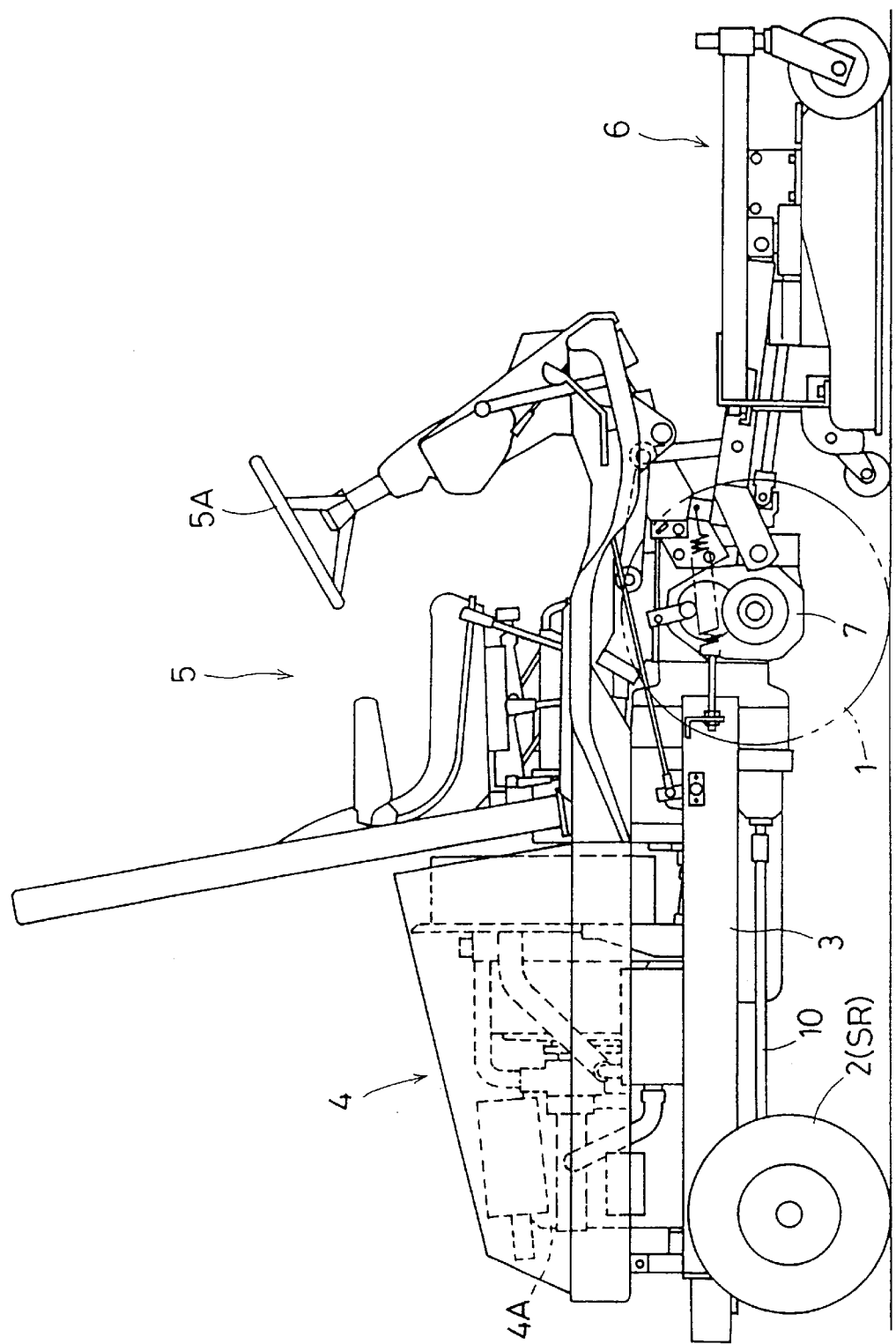
FIG. 1 is a side elevation of a front mower which is one example of four wheel drive working vehicles according to this invention.

As shown in FIG. 1, the front mower includes a vehicle body 3 having right and left front wheels 1 and right and left rear wheels 2. The vehicle body 3 has a motor section 4 and a driving platform 5 mounted thereon. A blade mower 6 which is one example of grass cutting implements is vertically movably coupled to the front of vehicle body 3.

Figure 5:
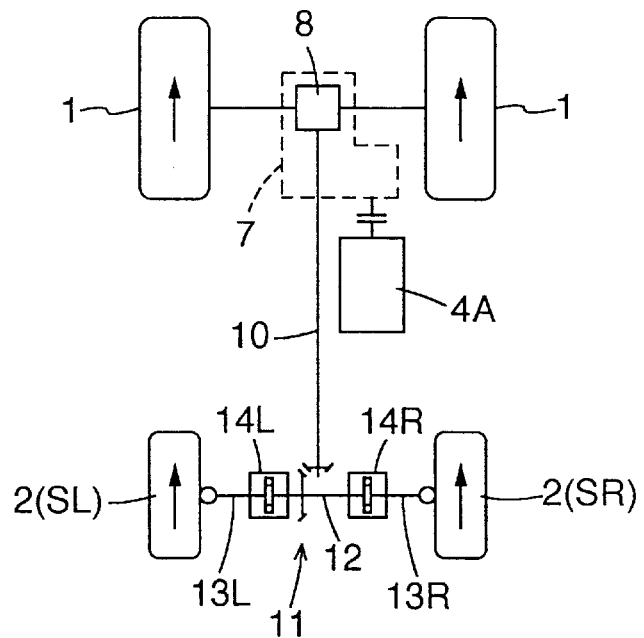
FIG. 5 is a plan view showing drive switching.
Figure 5:
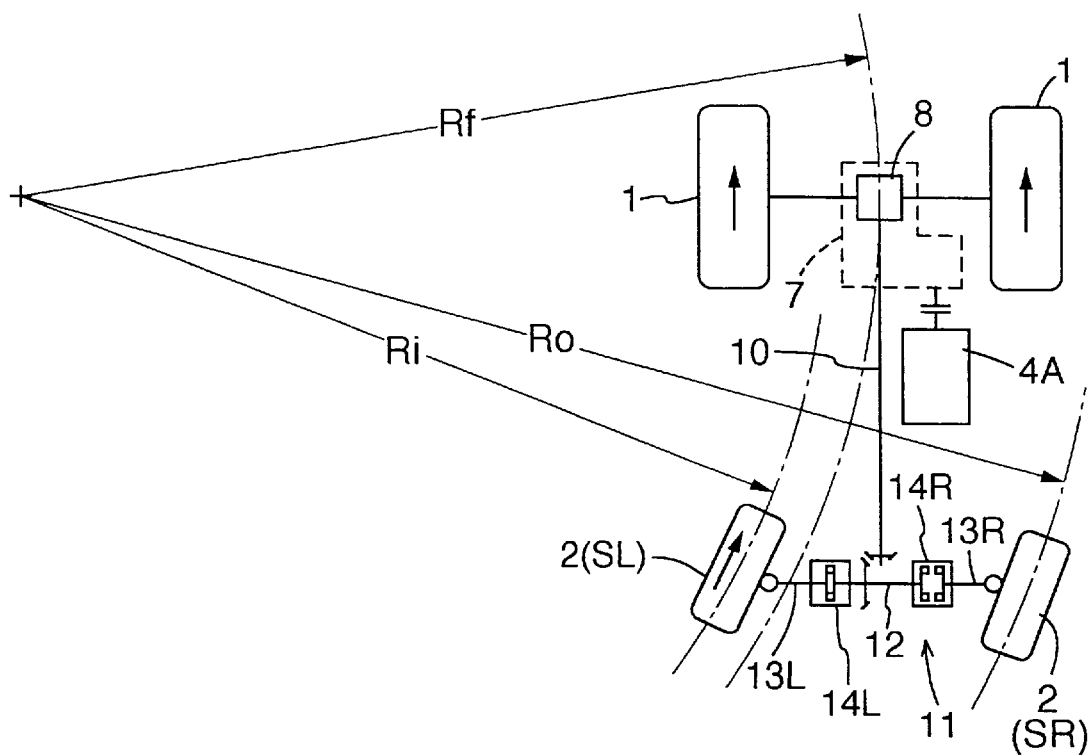
Figure 6:
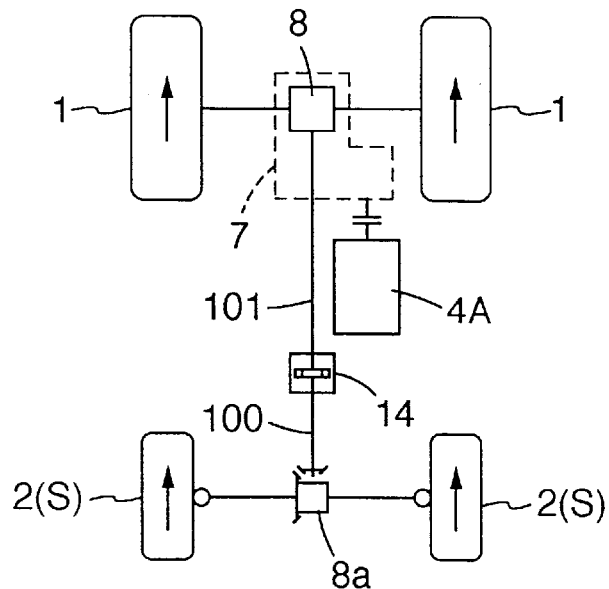
FIG. 6 is a plan view of a drive transmission line of a conventional front mower.
Figure 6:
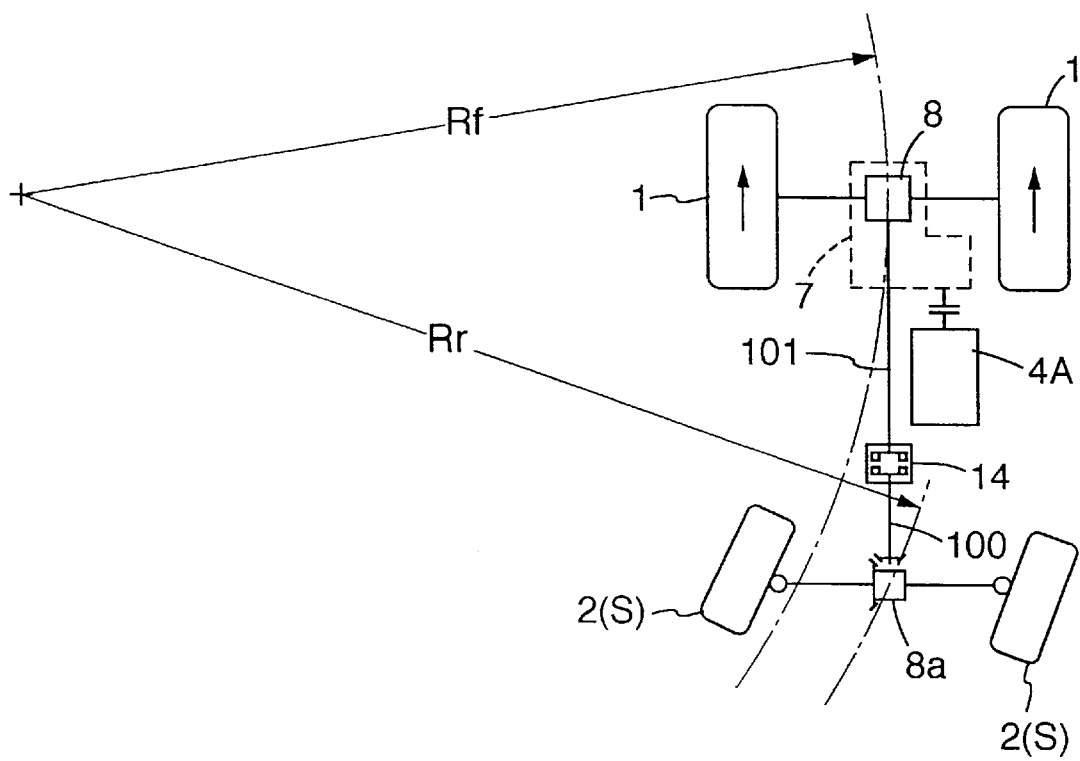

As shown in FIG. 5 also, the front wheels 1 and rear wheels 2 are both drive wheels. The rear wheels 2 are dirigible wheels SL and SR interlocked to a steering wheel 5A disposed on the driving platform 5.

FIG. 5(B) shows a transmission line extending from an engine 4A in the motor section 4 to the drive wheels. Drive is transmitted from the engine 4A to a transmission case 7, and then transmitted through a front wheel differential 8 to the front wheels 1. The transmission case 7 has a transmission shaft 10 for transmitting drive to the rear wheels 2 through a pair of gears 9A and 9B. The transmission line includes a clutch mechanism 11 operable, when the front mower makes a turn, to break the drive transmission only to an outer one of left and right dirigible wheels SL and SR.

Figure 2:
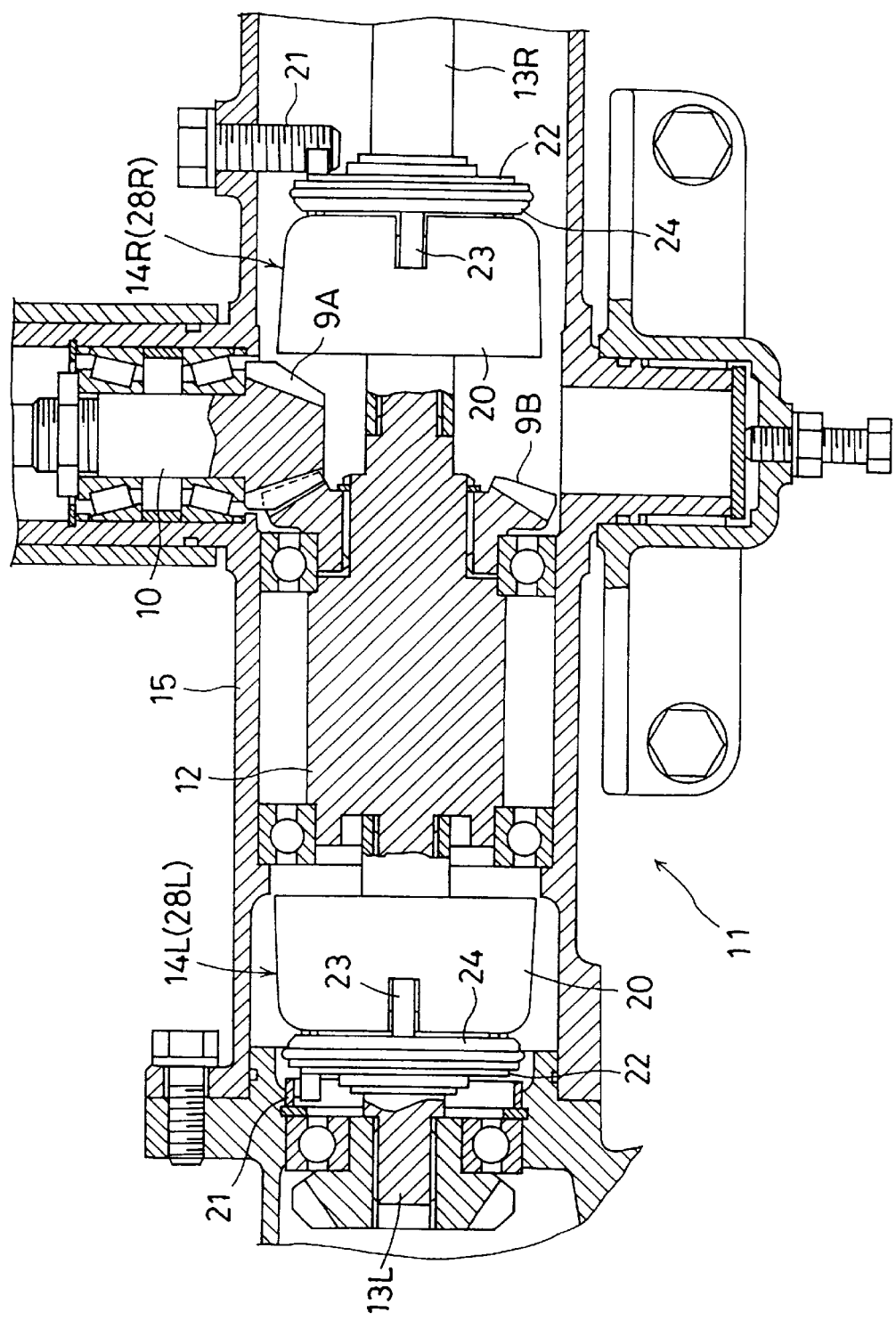
FIG. 2 is a cross section of a clutch mechanism.

As shown in FIG. 2, drive is transmitted from the transmission shaft 10 to an input shaft 12 through the pair of gears 9A and 9B. The drive transmitted to the input shaft 12 is transmitted to the clutch mechanism 11. The clutch mechanism 11 includes a pair of left and right dual one-way clutches 14L and 14R. Output shafts 13L and 13R extend outward from the one-way clutches 14L and 14R, respectively. The output shafts 13L and 13R transmit the drive to the dirigible wheels SL and SR, respectively.

The transmission shaft 10, input shaft 12, clutch mechanism 11 and output shafts 13L and 13R constitute a transmission device for transmitting drive from the engine 4A to the dirigible wheels SL and SR.

The pair of right and left dual one-way clutches 14L and 14R are automatically switchable between a position for transmitting the drive to the corresponding output shafts 13L and 13R and a position not transmitting the drive. The dual one-way clutches 14L and 14R are mounted in an axle case 15 through which the dirigible wheels SL and SR are supported by the vehicle body 3.

When the vehicle runs forward, the dual one-way clutches 14L and 14R are operable to break the forward drive transmission to the output shaft 13L and 13R whose forward rotating rate has become higher than a forward rotating rate of input shaft 12. When the vehicle runs backward, the dual one-way clutches 14L and 14R are operable to break the backward drive transmission to the output shaft 13L and 13R whose backward rotating rate has become higher than a backward rotating rate of input shaft 12.

Figure 3:
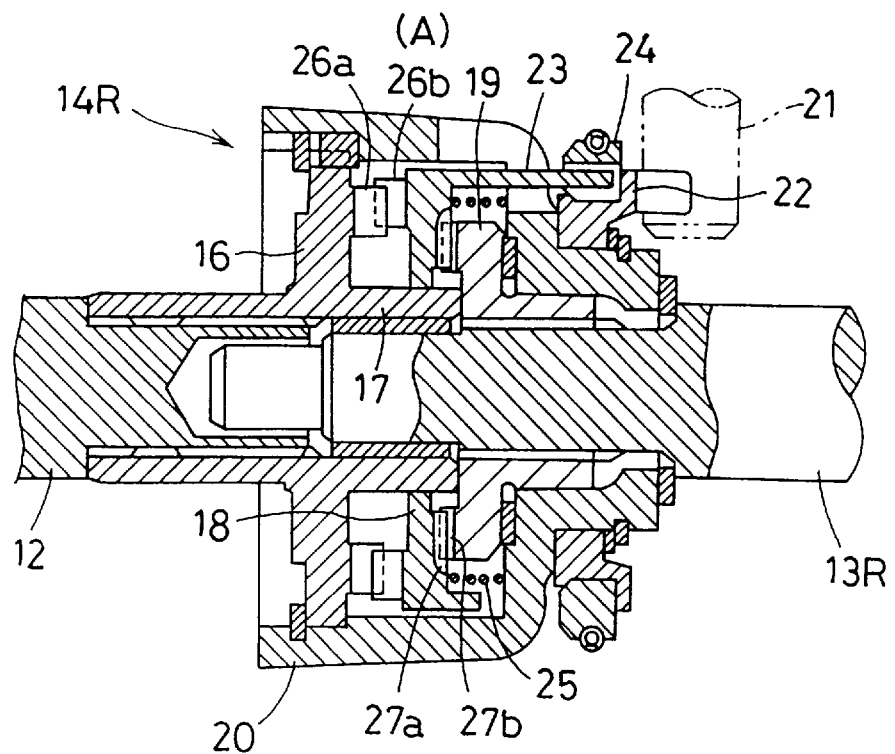
FIG. 3 is a view in vertical section of a dual one-way clutch.
Figure 3:
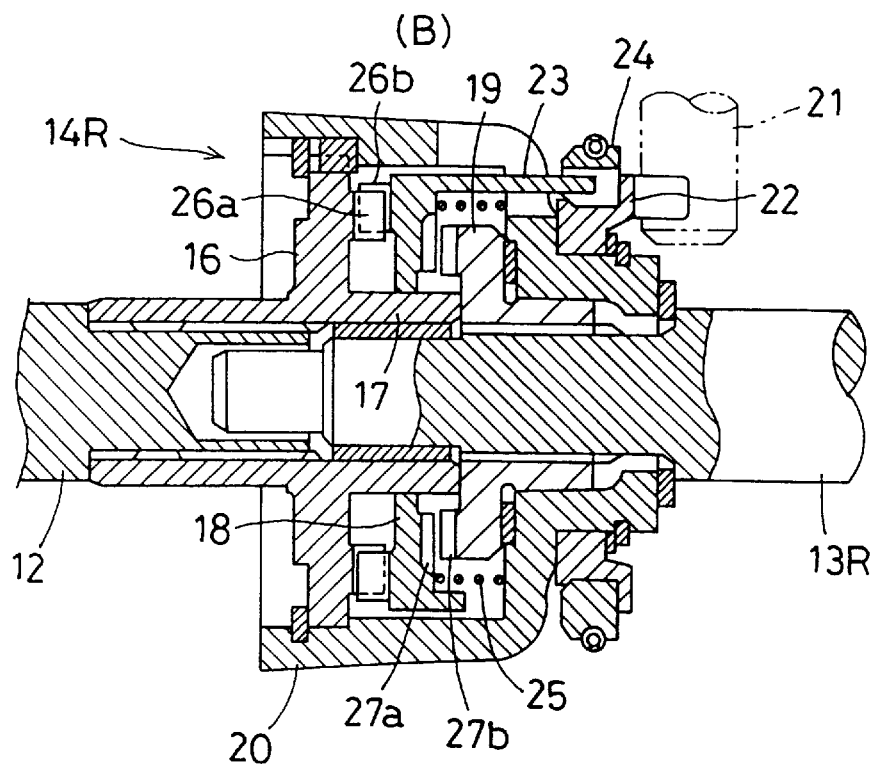
Figure 4:
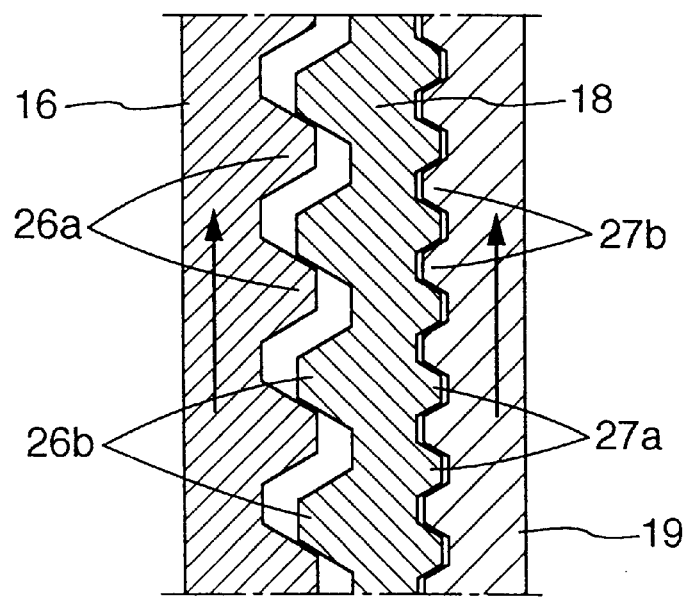
FIG. 4 is an explanatory view showing cams of the dual one-way clutch of FIG. 3.
Figure 4:
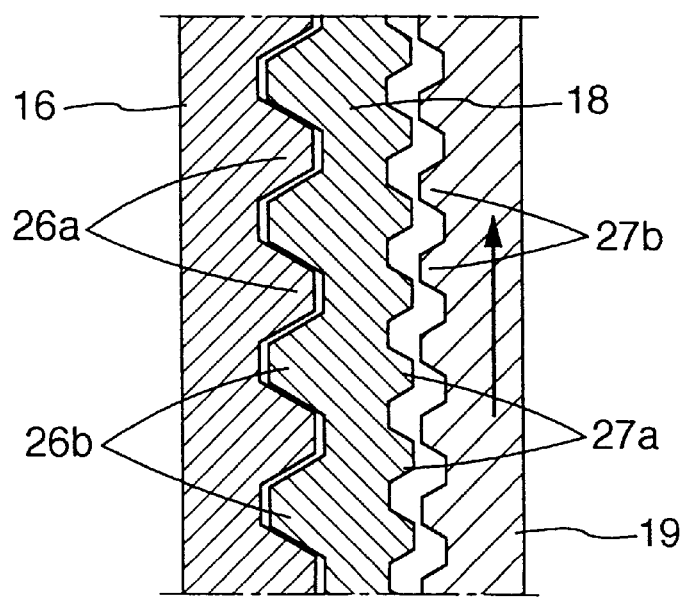

The dual one-way clutch 14R for acting on the right dirigible wheel SR will be described with reference to FIGS. 2 through 4.

The input shaft 12 and output shaft 13R are arranged coaxially. The input shaft 12 has a drive cam 16 mounted to be rotatable therewith and fixed axially thereof. The drive cam 16 has a boss 17 thereof supporting a center cam 18 to be axially movable within a predetermined range. The output shaft 13R has a driven cam 19 mounted to be rotatable therewith and fixed axially thereof. A rotary frame 20 is mounted on the drive cam 16 to be rotatable therewith. The rotary frame 20 has a brake ring 22 mounted to be rotatable relative thereto. The brake ring 22 is locked against rotation through engagement with a fixed element 21. A ring-shaped brake shoe 24 is rotatable with the center cam 18 through engagement with an arm 23 formed integral with the center cam 18. The brake shoe 24 is in slidable contact with the brake ring 22. A spring 25 is provided to bias the center cam 18 toward the drive cam 16, with the rotary frame 20 acting as a spring bearing.

The drive cam 16 and center cam 18 have a push cam 26a and a receptive cam 26b engageable with each other when the drive cam 16 rotates forward or backward, to transmit torque of drive cam 16 to the center cam 18. These cams 26a and 26b are schematically shown in FIGS. 4(A) and (B).

When the drive cam 16 rotates forward, as shown in FIGS. 3(A) and 4(A), the push cam 26a engages the receptive cam 26b, whereby the center cam 18 is moved away from the drive cam 16 against the biasing force of spring 25. The push cam 26a and receptive cam 26b are arranged to remain engaged (to effect the torque transmission) even when the center cam 18 is separated to a maximum extent from the drive cam 16. The push cam 26a and receptive cam 26b define a backlash therebetween. When the center cam 18 rotates faster than the drive cam 16, the backlash allows the center cam 18 to rotate ahead of the drive cam 16 and move to a position closest to the drive cam 16 under the biasing force of spring 25.

The center cam 18 and driven cam 19 define transmission cams 27a and 27b.

As shown in FIGS. 3(B) and 4(B), the transmission cams 27a and 27b are out of engagement with each other when the center cam 18 is in the closest position noted above. As the center cam 18 moves away from the drive cam 16, the transmission cams 27a and 27b are engaged to transmit the torque of center cam 18 to the driven cam 19.

Thus, when the input shaft 12 remains still, as shown in FIGS. 3(B) and 4(B), the center cam 18 lies in the closest position and the transmission cams 27a and 27b are out of engagement. When, in this state, the input shaft 12 or the drive cam 16 rotates forward or backward, as shown in FIG. 3(A), the push cam 26a engages the receptive cam 26b since the center cam 18 is subjected to a slight braking force due to the slidable contact between the brake shoe 24 and brake ring 22, whereby the torque of drive cam 16 is transmitted to the center cam 18. As the center cam 18 moves toward the separated position, the transmission cams 27a and 27b engage each other. As a result, the torque of input shaft 12 is transmitted from the drive cam 16 to the push cam 26a, from the push cam 26a to the receptive cam 26b, from the center cam 18 through the transmission cams 27a and 27b to the driven cam 19, and finally to the output shaft 13R to drive the dirigible wheel SR.

When the dirigible wheel SR rotates at high speed in this driving state so that the output shaft 13R has a higher rotating rate than the input shaft 12, the center cam 18 rotates ahead of the drive cam 16 as shown in FIGS. 3(B) and 4(B). Then, the center cam 18 moves to the closest position under the biasing force of spring 25 to disengage the transmission cams 27a and 27b from each other. This breaks the drive transmission from the input shaft 12 to the output shaft 13R, to place the dirigible wheel SR in a state of free rotation.

The dual one-way clutch 14L for acting on the left dirigible wheels SL has a similar construction.

The fixed element 21 of the left dual one-way clutch 14L is attached to the axle case 15 not to be rotatable. The other fixed element 21 is in the form of a bolt screwed to the axle case 15.

According to the above construction, when the vehicle runs straight forward or backward, as shown in FIG. 5(A), the two output shafts 13L and 13R rotate at the same rotating rate as the input shaft 12, and both dirigible wheels SL and SR are driven. When the vehicle makes a turn, as shown in FIG. 5(B) (which shows a left turn), an outer one of the dirigible wheels SL or SR has a turning radius Ro larger than a turning radius Rf of front wheel differential 8. The outer dirigible wheel SL or SR tends to be dragged to rotate at high speed. As a result, the rotating rate of output shaft 13L or 13R interlocked to the outer dirigible wheel SL or SR exceeds the rotating rate of input shaft 12, thereby to disengage the dual one-way clutch 14L or 14R for the outer dirigible wheel SL or SR. The drive transmission to the outer dirigible wheel SL or SR is broken to place the outer dirigible wheel SL or SR in a state of free rotation.

On the other hand, the inner dirigible wheel SR or SL has a turning radius Ri smaller than the turning radius Rf of front wheel differential 8. The rotating rate of output shaft 13R or 13L interlocked to the inner dirigible wheel SR or SL does not exceed the rotating rate of input shaft 12. Consequently, the dual one-way clutch 14R or 14L for the inner dirigible wheel SR or SL remains engaged to maintain the drive transmission to the inner dirigible wheel SR or SL to drive the inner dirigible wheel SR or SL.

Thus, the vehicle makes a turn in a three-wheel drive mode in which the two front wheels 1 and one of the rear wheels 2 are driven. FIG. 5(B) shows a forward running state. The same situation takes place in time of backward running since an outer one of the dirigible wheels SL or SR has a turning radius Ro larger than a turning radius Rf of front wheel differential 8, and the inner dirigible wheel SR or SL has a turning radius Ri smaller than the turning radius Rf of front wheel differential 8.

In the above embodiment, the dual one-way clutches 14L and 14R are provided, which are operable, when the vehicle makes a turn in forward or backward running, to break the drive transmission to an outer one of the dirigible wheels SL or SR, and maintain the drive transmission to the inner dirigible wheel SR or SL. Instead of the dual one-way clutches 14L and 14R, one-way clutches 28L and 28R may be provided, as shown in FIG. 2, which break the drive transmission to the output shaft 13L or 13R when the rotating rate of output shaft 13L or 13R exceeds the rotating rate of input shaft 12 during forward running. The one-way clutches 28L and 28R may break the drive transmission to the output shaft 13L or 13R when the rotating rate of output shaft 13L or 13R exceeds the rotating rate of input shaft 12 during backward running.

In the foregoing embodiment, the dual one-way clutches 14L and 14R are provided, which are operable to break the drive transmission to an outer one of the dirigible wheels SL or SR, and maintain the drive transmission to the inner dirigible wheel SR or SL. Instead of the dual one-way clutches 14L and 14R, clutches may be provided which are interlocked mechanically or electrically to a steering operation or steering action to break the drive transmission to an outer one of the dirigible wheels SL or SR.

In the foregoing embodiment, the rear wheels 2 are made dirigible wheels SL and SR. Instead, the front wheels 1 may act as dirigible wheels SL and SR.

In the foregoing embodiment, the invention is applied to the front mower having the blade mower acting as grass cutting implement 6. The invention is applicable also to a front mower having a reel mower-type cutting unit acting as grass cutting implement 6. Further, the invention is applicable to a lawn mower having a grass cutting implement 6 disposed between front wheels 1 and rear wheels 2, and to a lawn mower with a grass cutting implement 6 disposed at the rear of the vehicle body.

This invention may be applied to various four wheel drive working vehicles other than lawn mowers, such as tractors.

What is claimed is:

1. A four wheel drive working vehicle comprising:
    a vehicle body;
    an engine supported by said vehicle body;
    a pair of dirigible wheels supported by said vehicle body;
    a second pair of wheels supported by said vehicle body for receiving drive from said engine; and
    transmission means for transmitting drive from said engine to said pair of dirigible wheels, said transmission means including:
        a transmission shaft for receiving the drive from said engine;
        an input shaft for receiving the drive from said transmission shaft through a bevel gearing, and dividing the drive to right and left sides of said vehicle body;
        right and left output shafts for receiving the drive divided by said input shaft, said right and left output shafts transmitting the drive to said pair of dirigible wheels, respectively;
        a clutch mechanism operable, when said vehicle makes a turn, to break the drive transmission to one of said dirigible wheels lying outwardly with respect to a turn center, and to maintain the drive transmission to the other dirigible wheel lying inwardly with respect to said turn center, wherein said clutch mechanism has a right clutch disposed between said right output shaft and said input shaft, and a left clutch disposed between said left output shaft and said input shaft, whereby said right and left clutches are spaced laterally inwardly from an innermost portion of said dirigible wheels;
    wherein each said left and right clutch includes a drive cam mounted on said input shaft to be rotatable therewith, a driven cam mounted on said output shaft to be rotatable therewith, and a center cam interposed between and coaxial with said drive cam and said driven cam, said center cam having a first set of gear teeth adapted to engage a third set of gear teeth defined on said drive cam, and a second set of gear teeth adapted to engage a fourth set of gear teeth defined on said driven cam; and
    wherein, when said vehicle runs straight, said first and second sets of gear teeth are engaged with said third and fourth sets of gear teeth, respectively, whereas when said vehicle makes a turn, said second teeth of said center cam lying outwardly with respect to the turn center are fully disengaged from said fourth teeth of said driven cam corresponding to this center cam to permit unencumbered rotation of this driven cam; and
    a brake mechanism operable to provide said center cam with a resistance to a torque upon said center cam.

2. The four wheel drive working vehicle as defined in claim 1, wherein said dirigible wheels are rear wheels.

3. The four wheel drive working vehicle as defined in claim 1, wherein said four wheel drive working vehicle is a front mower having a grass cutting implement disposed forwardly of said vehicle body.

4. The four wheel drive working vehicle as defined in claim 1, wherein said left and right clutches include one-way clutches operable, when a rotating rate of a corresponding one of said output shafts exceeds a rotating rate of said input shaft, to break the drive transmission from said input shaft to said corresponding one of said output shafts.

5. The four wheel drive working vehicle as defined in claim 4, wherein said left and right one-way clutches are dual one-way clutches operable, when dirigible wheels are driven backward and a backward rotating rate of a corresponding one of said output shafts exceeds a rotating rate of said input shaft, to break the drive transmission from said input shaft to said corresponding one of said output shafts.

6. The four wheel drive working vehicle as defined in claim 4, wherein said left and right clutches are interlocked to a steering mechanism to break the drive transmission to one of said dirigible wheels.

7. The four wheel drive working vehicle as defined in claim 1, wherein:
    said transmission shaft extends from said engine in a fore and aft direction of said vehicle body;
    said bevel gearing includes a first bevel gear provided on an end of said transmission shaft remote from said engine, and a second bevel gear provided on said input shaft adapted to be meshed with said first bevel gear;
    said input shaft includes a single shaft extending transversely of said vehicle body, said right and left clutches arranged on right and left ends of said input shaft, respectively, and said second bevel gear located at an intermediate portion of said input shaft; and
    said input shaft extends coaxial with said right and left output shafts across said right and left clutches, respectively.

8. The four wheel drive working vehicle as defined in claim 7, wherein said dirigible wheels are rear wheels.

9. The four wheel drive working vehicle as defined in claim 7, wherein said four wheel drive working vehicle is a front mower having a grass cutting implement disposed forwardly of said vehicle body.

10. The four wheel drive working vehicle as defined in claim 7, wherein said left and right clutches include one-way clutches operable, when a rotating rate of a corresponding one of said output shafts exceeds a rotating rate of said input shaft, to break the drive transmission from said input shaft to said corresponding one of said output shafts.

11. The four wheel drive working vehicle as defined in claim 10, wherein said left and right one-way clutches are dual one-way clutches operable, when dirigible wheels are driven backward and a backward rotating rate of a corresponding one of said output shafts exceeds a rotating rate of said input shaft, to break the drive transmission from said input shaft to said corresponding one of said output shafts.

12. The four wheel drive working vehicle as defined in claim 10, wherein said left and right clutches are interlocked to a steering mechanism to break the drive transmission to one of said dirigible wheels.

13. The four wheel drive working vehicle as defined in claim 1, wherein said brake mechanism is provided adjacent to each said output shaft.

14. The four wheel drive working vehicle as defined in claim 13, wherein said dirigible wheels are rear wheels.

15. The four wheel drive working vehicle as defined in claim 13, wherein said four wheel drive working vehicle is a front mower having a grass cutting implement disposed forwardly of said vehicle body.

16. The four wheel drive working vehicle as defined in claim 13, wherein said left and right clutches include one-way clutches operable, when a rotating rate of a corresponding one of said output shafts exceeds a rotating rate of said input shaft, to break the drive transmission from said input shaft to said corresponding one of said output shafts.

17. The four wheel drive working vehicle as defined in claim 16, wherein said left and right one-way clutches are dual one-way clutches operable, when dirigible wheels are driven backward and a backward rotating rate of a corresponding one of said output shafts exceeds a rotating rate of said input shaft, to break the drive transmission from said input shaft to said corresponding one of said output shafts.

18. The four wheel drive working vehicle as defined in claim 16, wherein said left and right clutches are interlocked to a steering mechanism to break the drive transmission to one of said dirigible wheels.

19. A four wheel drive working vehicle comprising:
a vehicle body;
an engine supported by said vehicle body; a pair of dirigible wheels supported by said vehicle body, wherein the pair of wheels are rear wheels;
a second pair of wheels supported by said vehicle body for receiving drive from said engine; and
transmission means for transmitting drive from said engine to said pair of dirigible wheels, said transmission means including:
  a transmission shaft for receiving the drive from said engine;
  an input shaft for receiving the drive from said transmission shaft through a bevel gearing, and dividing the drive to right and left sides of said vehicle body;
  right and left output shafts for receiving the drive divided by said input shaft, said right and left output shafts transmitting the drive to said pair of dirigible wheels, respectively; and
  a clutch mechanism operable, when said vehicle makes a turn, to break the drive transmission to one of said dirigible wheels lying outwardly with respect to a turn center, and to maintain the drive transmission to the other dirigible wheel lying inwardly with respect to said turn center, wherein said clutch mechanism has a right clutch disposed between said right output shaft and said input shaft, and a left clutch disposed between said left output shaft and said input shaft, whereby said right and left clutches are spaced laterally inwardly from an innermost portion of said dirigible wheels;
wherein each said left and right clutch includes a drive cam mounted on said input shaft to be rotatable therewith, a driven cam mounted on said output shaft to be rotatable therewith, and a center cam interposed between and coaxial with said drive cam and said driven cam adapted to engage said drive cam and said driven cam, said center cam having a first set of gear teeth adapted to engage a third set of gear teeth defined on said drive cam, and a second set of gear teeth adapted to engage a fourth set of gear teeth defined on said driven cam adapted to engage said drive cam and said driven cam;
wherein when said vehicle runs straight, said first and second sets of gear teeth are engaged with said third and fourth sets of gear teeth, respectively, whereas when said vehicle makes a turn, said second teeth of said center cam laying outwardly with respect to the turn center are fully disengaged from said fourth teeth of said driven cam corresponding to this center cam to permit unencumbered rotation of this driven cam; and
a brake mechanism adjacent to each said output shaft, said brake mechanism operable to provide said center cam with a resistance to a torque upon said center cam.

20. A four wheel drive working vehicle comprising:
a vehicle body;
an engine supported by said vehicle body;
a pair of dirigible wheels supported by said vehicle body;
a second pair of wheels supported by said vehicle body for receiving drive from said engine; and
transmission means for transmitting drive from said engine to said pair of dirigible wheels, said transmission means including:
  a transmission shaft for receiving the drive from said engine;
  an input shaft for receiving the drive from said transmission shaft through a bevel gearing, and dividing the drive to right and left sides of said vehicle body;
  right and left output shafts for receiving the drive divided by said input shaft, said right and left output shafts transmitting the drive to said pair of dirigible wheels, respectively; and
  a clutch mechanism operable, when said vehicle makes a turn, to break the drive transmission to one of said dirigible wheels lying outwardly with respect to a turn center, and to maintain the drive transmission to the other dirigible wheel lying inwardly with respect to said turn center, wherein said clutch mechanism has a right clutch disposed between said right output shaft and said input shaft, and a left clutch disposed between said left output shaft and said input shaft, whereby said right and left clutches are spaced laterally inwardly from an innermost portion of said dirigible wheels, and
wherein each said left and right clutch includes a drive cam mounted on said input shaft to be rotatable therewith, a driven cam mounted on said output shaft to be rotatable therewith, and a center cam interposed between and coaxial therewith said drive cam and said driven cam, said center cam having a first set of gear teeth adapted to engage a third set of gear teeth defined on said drive cam, and a second set of gear teeth adapted to engage a fourth set of gear teeth defined on said driven cam wherein said left and right clutches include one-way clutches operable, when a rotating rate of a corresponding one of said output shafts exceeds a rotating rate of said input shaft, to brake the drive transmission from said input shaft to said corresponding one of said output shafts; and wherein, when said vehicle runs straight, said first and second sets of gear teeth are engaged with said third and fourth sets of gear teeth, respectively, whereas when said vehicle makes a turn, said second teeth of said center cam lying outwardly with respect to the turn center are fully disengaged from said fourth teeth of said driven cam corresponding to this center cam to permit unencumbered rotation of this driven cam; and a brake mechanism adjacent to each said output shaft, said brake mechanism operable to brake said center cam.

* * * * *

UNITED STATES PATENT AND TRADEMARK OFFICE
CERTIFICATE OF CORRECTION

PATENT NO. : 6,470,659 B2
DATED : October 29, 2002
INVENTOR(S) : Teruo Shimamura et al.

It is certified that error appears in the above-identified patent and that said Letters Patent is hereby corrected as shown below:

<u>Title page,</u>
Item [*], Notice, prior to "Subject to any disclaimer" please insert -- This patent issued on a continued prosecution application filed under 37 CFR 1.53(d), and is subject to the twenty year patent term provisions of 35 U.S.C. 154(a)(2). --
Item [30], Foreign Application Priority Data, "Sep. 26, 1998" should read -- March 26, 1998 --.

Signed and Sealed this

Twenty-seventh Day of May, 2003

JAMES E. ROGAN
*Director of the United States Patent and Trademark Office*